W. E. McFEE.
CONNECTING LINK.
APPLICATION FILED MAY 21, 1920.
1,368,175.
Patented Feb. 8, 1921.
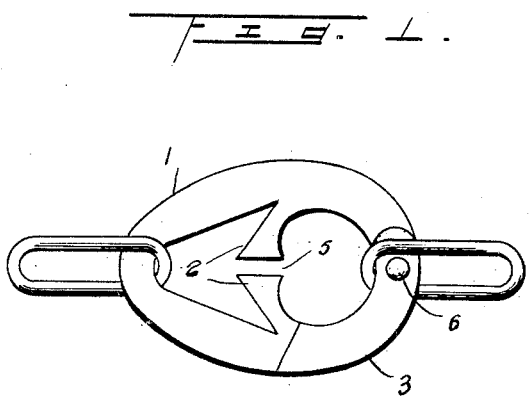
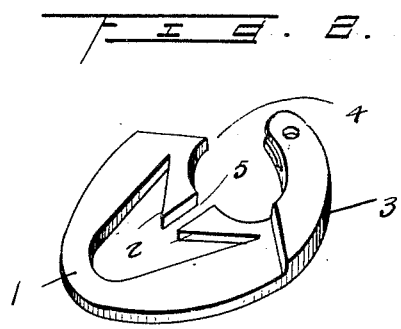
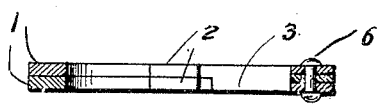
Inventor
W. E. McFee

UNITED STATES PATENT OFFICE.

WILLIAM E. McFEE, OF MOUNT CARROLL, ILLINOIS.

CONNECTING-LINK.

1,368,175. Specification of Letters Patent. Patented Feb. 8, 1921.

Application filed May 21, 1920. Serial No. 383,219.

*To all whom it may concern:*

Be it known that I, WILLIAM E. McFEE, a citizen of the United States, residing at Mount Carroll, in the county of Carroll and State of Illinois, have invented certain new and useful Improvements in Connecting-Links; and I do hereby declare the following to be a full, clear, and exact description of the invention, such as will enable others skilled in the art to which it appertains to make and use the same.

This invention relates to connecting links and it consists in the novel features hereinafter described and claimed.

An object of the invention is to provide a link of simple and durable structure especially adapted to be used for connecting the terminal links of two chain sections together whereby a continuous chain may be produced.

With this object in view the link comprises two members of like design, configuration and dimension, pivotally connected together for swinging movement with relation to each other in parallel planes there being means provided upon each member for limiting the swinging movement of the other member.

Each member comprises an ovate rim portion having at its side in the vicinity of its larger end an opening through which the link of a chain may be inserted. Inwardly disposed lugs are carried by the side portions of the rim and the lugs are spaced from each other at their inner end. The rim portion is provided at its side and in the vicinity of its larger end with a stop portion which serves to limit the swinging movement of the complementary link member and to close the opening in the rim portion thereof when the link members are closed or swung so that their corresponding parts are juxtaposed with relation to each other.

In the accompanying drawings:—

Figure 1 is a plan view showing the connecting link in engagement with the terminal links of the two chain sections.

Fig. 2 is a perspective view of one of the members of the connecting link.

Fig. 3 is a longitudinal sectional view of the connecting link.

As illustrated in Fig. 1 of the drawings the connecting link is adapted to be applied to the terminal links of two chain sections whereby a continuous chain made up of sections is provided. The connecting link is made up of two members of similar design and configuration and a description of one will answer for both. Each link member comprises a rim portion 1 which is approximately ovate in plan. Lugs 2 extend inwardly from the sides of the rim portion 1 and are spaced from each other at their inner ends as at 5. The rim portion 1 is provided at its side and in the vicinity of the larger end of the oval with a stop portion 3 and the rim portion 1 is provided at its opposite side with an opening 4 which is equal in length to the length of the stop portion 3. The link members are connected together at their larger ends by means of a pivot 6 whereby the said members may swing in parallel planes with relation to each other. When the link members are swung to closed position the stop portion 3 of one member is located in the opening 4 of the other member and fills the same; also the rim portions 1 and the lugs 2 of the two link members are interposed with relation to each other.

The lugs 2 are adapted to act as stops for the chain link when positioned in the inner end of the connecting link, and prevents the same from passing beyond said lugs and if the link portions 1 swing slightly on their pivots, one pair of the lugs will close the space between the other pair of lugs, to prevent the chain links from entering the outer end of the connecting link or passing outwardly through the opening 4. The chain link being confined within the inner end of the connecting link prevents the link portions 1 from swinging on their pivots beyond a given degree and thus keeps the connecting link closed.

When it is desired to attach the connecting link to the terminals of a chain section the members of the connecting link are swung to an open position with relation to each other and the terminal link of the chain section is passed through the opening 4 of one of the members of the connecting link then through the opening 4 of the other member. The members of the connecting link are then swung so that their rear portions and lugs 2 register with each other and are interposed and then the links of the chain may be slipped through the spaces 5 between the inner ends of the lugs 2 so that the links of the chain may engage the inner end of the ovate connecting link. To disconnect the chain link from the connecting link the operation above referred to is reversed. It is obvious that the terminal link of a chain may be connected with the larger end portion of the connecting link by swinging the members of the connecting link apart and inserting the terminal link of the same section through the openings 4 of the rim portion 2 and then closing the link members with relation to each other.

From the foregoing description taken in connection with the accompanying drawings it will be seen that a connecting link of simple and durable structure is provided and that the same may be used to advantage for easily and quickly connecting two chain sections together to provide a continuous chain.

Having described my invention what is claimed is:—

1. A connecting link comprising members pivoted together for swinging movement in parallel planes, each member having a rim portion provided with an opening and a stop portion, the stop portion of one member adjusted to fit in the opening of the other member when the members are closed with relation to each other, and each of said members being provided at its sides with inwardly disposed lugs which are spaced from each other at their inner ends, said lugs adapted to lie one upon the other when the members are closed and the lugs of one member adapted to close the space between the lugs of the other member in case of slight relative movement of said members in relation to each other.

2. A connecting link comprising members which are ovate in plan, said members being pivotally connected together for swinging movement in parallel planes, each member being provided at its side with an opening, each member having at that side opposite the side which is provided with the opening a stop portion, the stop portion of one member adapted to enter the opening in the other member when the members are closed with relation to each other and each of the said members being provided at its sides with inwardly disposed lugs which are spaced from each other at their inner ends, the said lugs adapted to lie one upon the other when the members are swung to closed position with relation to each other and the lugs of one member adapted to close the space between the lugs of the other member in case of slight relative movement of said members in relation to each other.

In testimony whereof I affix my signature in presence of two witnesses.

WILLIAM E. McFEE.

Witnesses:
   MADGE F. DYNES,
   BEULAH C. HANNER.